United States Patent Office 3,579,584
Patented May 18, 1971

3,579,584
PREPARATION OF AMINES
Horst Rutzen and Rolf Brockmann, Dusseldorf-Holthausen, Germany, assignors to Henkel & Cie, G.m.b.H., Dusseldorf, Germany
No Drawing. Filed Dec. 9, 1968, Ser. No. 782,427
Claims priority, application Germany, June 11, 1968,
P 17 68 641.8
Int. Cl. C07c 85/00, 85/02, 85/12
U.S. Cl. 260—583
9 Claims

ABSTRACT OF THE DISCLOSURE

A process for the preparation of amines having the formula

(I)

wherein $R_1$ and $R_2$ are selected from the group consisting of hydrogen and alkyl of 1 to 4 carbon atoms and R is selected from the group consisting of saturated and unsaturated straight and branch aliphatic and cycloaliphatic of 4 to 24 carbon atoms and aromatic of 6 to 24 carbon atoms which may be substituted with one

which comprises reacting a carboxylic acid ester in one step with a nitrogen compound of the formula

at a temperature of 200 to 400° C. in the presence of hydrogen which may be diluted with a reaction-insert gas at a pressure of 50 to 400 atmospheres and in the presence of a metal oxide catalyst in lump form selected from the group consisting of zinc oxide-chromium oxide and zinc oxide-aluminum oxide catalysts.

PRIOR ART

The starting materials for known commercial preparation of amines of Formula I have been carboxylic acid nitriles or carboxylic acid amides which have to be prepared by separate reactions. These starting materials are generally prepared from the carboxylic acid esters obtained by ester exchange from naturally occuring esters such as glycerides. This procedure has the advantage over free carboxylic acids in lack of corrosion and handling. Until now there has been no known direct preparation of amines from carboxylic acid ester starting materials.

OBJECTS OF THE INVENTION

It is an object of the invention to provide a novel method for the preparation of amines in a one-step process.

It is a further object of the invention to provide a commercial process for the production of amines of Formula I directly from the corresponding carboxylic acid ester and ammonia or primary or secondary amine.

These and other objects and advantages of the invention will become obvious from the following detailed description.

THE INVENTION

The novel process of the invention for the preparation of amines having the formula

wherein $R_1$ and $R_2$ are selected from the group consisting of hydrogen and alkyl of 1 to 4 carbon atoms and R is selected from the group consisting of saturated and unsaturated, straight and branch aliphatic and cycloaliphatic of 4 to 24 carbon atoms and aromatic of 6 to 24 carbon atoms which may be substituted with at least one

comprises reacting an ester of a monovalent alcohol and an aliphatic, cycloaliphatic or aromatic mono or polycarboxylic acid of 4 to 24 carbon atoms with a nitrogen compound of the formula

wherein $R_1$ and $R_2$ have the above definitions at temperatures of 200 to 400° C., preferably 250 to 350° C. and in the presence of hydrgen which may be diluted with a reaction-inert gas at a pressure of 50 to 400, preferably 100 to 300, atmospheres and in the presence of a metal oxide catalyst in lump form. The weight ratio of carboxylic acid ester to nitrogen compound may be 1:0.1X to 1:10X, preferably 1:0.3X to 1:2X, where X is number of ester groups in the starting material. The process has the advantage of being continuous.

The metal oxide catalyst is preferably a mixed metal oxide containing zinc oxide. Examples of other metals than zinc oxide are oxides of aluminum, chromium, titanium, vanadium, molybdenum, tungsten or mixtures thereof. Additionally, small amounts of other metal oxide may be present such as barium, tin or cadmium. The preferred catalysts are zinc-aluminum oxide or zinc-chromium oxide.

The catalysts may be prepared by mixing the metal oxides, hydroxides or carbonates concerned in a paste-like or suspended form followed by drying in known way.

The catalyst is used in lump form. The dried catalyst mixture may either be broken into fragments or made into tablets after grinding, if desired with addition of binders and/or graphite.

The catalyst is subjected, if desired, to a careful reduction before use. This is necessary when oxides of transition metals in their highest stage of valency are used for the preparation of the catalyst, for example when chromium sesquioxide is used, which in the after-treatment is reduced to the trivalent stage. The catalysts may also be subjected to a high temperature treatment in the presence of nitrogen or reducing gases and/or vapors at 500–1000° C. in order to increase their activity.

Suitable starting materials are esters of monovalent alcohols and straight or branched chain, saturated or unsaturated aliphatic monocarboxylic acids with preferably 4 to 24 carbon atoms, such as butyric acid, valeric acid, isovaleric acid, capric acid, caproic acid, dipropylacetic acid, lauric acid, palmitic acid, stearic acid, oleic acd, linoleic acid or behenic acid, etc.; cycloaliphatic monocarboxylic acids such as cyclopentanecarboxylic acid, cyclohexanecarboxylic acid, naphthenic acids, etc.; and mono- or poly-nuclear aromatic monocarboxylic acids such as benzoic acid, phenylacetic acid, diphenylmethanecarboxylic acid, naphthalenecarboxylic acids, etc.

Suitable dicarboxylic acids whose monovalent alcohol esters are useful for starting substances in which no formation of an internal anhydride takes place under the reaction conditions are aliphatic dicarboxylic acids such as glutaric acid, adipic acid, azelaic acid, sebacic acid, brassylic acid octadecanedicarboxylic acid - (1,18), eicosanedicarboxylic acid - (1,20); cycloaliphatic dicarboxylic acids such as cyclohexanedicarboxylic acid-(1,4); mono- and polynuclear aromatic dicarboxylic acids such as isophthalic acid, terephthalic acid, naphthalenedicarboxylic acid-(1,6) etc. The said mono- and di-carboxylic acids may be substituted by residues or groups which do not interfere with the reaction such as ether residues or amino groups.

Esters of monocarboxylic acids or their mixtures obtained from natural fats and oils are preferred starting materials for the process of invention. Examples of such carboxylic acids are lauric acid, myristic acid, palmitic acid, stearic acid, behenic acid, oleic acid or linoleic acid. Such esters are prepared by ester exchange with known fat preparations and may be used as mixtures as they are produced by ester exchange.

The monovalent alcohol moiety of the carboxylic acid esters is preferably a lower aliphatic alcohol of 1 to 4 carbon atoms. Examples of suitable alcohols are methanol, ethanol, isopropanol, butanol, propanol, etc.

The nitrogen compound may be ammonia or mono- or dialkyl amines with 1 to 4 carbon atoms in the alkyl residue, such as mono- and dimethylamine, mono- and diethylamine, primary and secondary propylamines and butylamines. The nitrogen compound may be recovered and reused.

If desired, the alkylamines may be produced in situ from their initial starting alkanol and ammonia, such as methanol and ammonia instead of the methylamines. The alcohol in this case serves at the same time as a solvent or diluent for the fatty acid glyceride to be fed in.

Ammonia and its mono- and di-methyl substitution products are used with particular advantage as the amine components. The carboxylic acid esters are suitably fed into the reaction apparatus jointly with ammonia or lower amines or the substances from which they are formed in situ. It is advantageous to preheat the reactants to 50–350° C. before feeding them into the reaction apparatus. The reaction may be carried out in the usual continuously operating pressure hydrogenation apparatus with recycling of gas.

Commercially pure hydrogen may be used for the reduction if it is suitably used in an excess amounting to 50 to 500 times the amount theoretically required. A part of the hydrogen may be replaced by any gases which are inert under the reaction conditions. The hydrogen or the hydrogen-inert gas mixture is preferably recycled. The amount of gas, under pressure, recycled is preferably 10 to 50, preferably 20 to 30, pressure liters per hour.

The products of the process may be used as flotation assistants, road building assistants, agents for protecting against corrosion and for the synthesis of surface-active products.

In the following examples there are described several preferred embodiments to illustrate the invention. However, it should be understood that the invention is not intended to be limited to the specific embodiments.

PREPARATION A

Zinc oxide-aluminum oxide catalyst 50 kg. of technical pulverulent zinc oxide and 50 kg. of aluminum hydroxide (crystalline form, bulk density 1275 g. per liter) were mixed with water in a kneader to form a stiff paste. The paste was dried at 80° C. and the solid cake formed was finely ground. After addition of 3% by weight of graphite, the powder was press-moulded into 4 mm. tablets.

PREPARATION B

Zinc oxide-chromium oxide catalyst 81.4 kg. of technical pulverulent zinc oxide and 60 kg. of chromium sesquioxide were mixed in a kneader with water to form a stiff paste. The paste was dried at 80° C. and the solid cake formed as finely ground. The powder was mixed with 3% by weight of graphite and press-moulded into 6 mm. tablets.

EXAMPLE I 12 liters of the catalyst tablets of preparation B were placed in a hydrogenation apparatus with a 14 liter pressure oven, a gas circulating system, a condenser and a pressure separator. Nitrogen under pressure of 50 atmospheres was first passed through the gas circulation section of the hydrogenation apparatus, while the oven was heated up to 280° C. By addition of small quantities of hydrogen to the nitrogen cycle, the zinc-chromium oxide fraction of the catalyst was reduced so slowly that no appreciable rise in temperature occurred. The reducing pretreatment of the catalyst was carried out for a period of about 50 hours The circulating gas was then replaced by hydrogen and the oven heated up to 300° C. at a pressure of 250 atmospheres and a gas circulation speed of 385 pressure liters per hour. After reaching this temperature, 1 liter of methyl laurinate and 400 g. of ammonia preheated together to 310° C., were fed hourly into the oven. The recovered recycling gas contained about 5% by volume of ammonia and about 1.2 liters of reaction product were removed hourly from the pressure separator.

The reaction product was freed from dissolved volatile substances by heating in a water-jet vacuum until boiling began. The amine number (AZ) of the crude product thus obtained was 285. A 500 g. sample of the crude product was distilled over an 80 cm. saddle-shaped column and gave 88.6% of distillable substance. The amine number of the distillate was 291. The NMR examination showed a content of 60% of dodecylamine and 40% of N-methyl dodecylamine. No trace of esters, amides or nitriles was found.

The amine number of the crude product was determined as the amount of potassium hydroxide in mg. which corresponds to the amount of hydrochloric acid consumed during the formation of the hydrochloride of 1 g. of amine. In order to determine the yield, an aliquot part of the crude product was distilled and the distillation residue was weighed and an amine number determination and NMR and infrared spectrographic examination and gas chromatographic tests were carried out with the distillable fraction.

EXAMPLE II

Example I was repeated except that 1 liter of a 2:1 weight ratio of methyl laurate and methanol and 400 gm. of ammonia were preheated together up to 310° C. and then fed hourly into the reaction and 1.1 liters of reaction product were removed hourly. The crude product, worked up according to Example I, had an amine number of 277 after decanting off water and distilling. The product contained 90% by weight of distillable substance having an amine number of 278. The NMR spectographic examination of the distillate showed a 36% content of dodecylamine, 56% of N-methyl dodecylamine and 8% of N,N-dimethyldodecylamine without any trace of nitrile, ester or amide.

EXAMPLE III

Into the hydrogen apparatus of Example I, there was introduced a mixture of 1 liter of methyl capyrlate and 500 gm. of ammonia, preheated together to 300° C., each hour and the reaction was carried out at 300° C., a pressure of 240 atmospheres and a gas circulation speed of 385 pressure liters per hour. The recovered cycling gas contained 4% by volume of ammonia and 1.1 liters of reaction product were recovered per hour. The crude product worked up as in Example I, had an amine number of 399 and contained 88% by weight of distillable product having an amine number of 420. The NMR spectrographic examination showed a 46% content of octylamine, 50% of N-methyl octylamine and 4% of N,N-dimethyl octylamine and 0.2% of caprylnitrile. No trace of ester or amide was found.

EXAMPLE IV

Example I was repeated with the addition of 1 liter of methyl stearate and 400 gm. of ammonia, heated together to 300° C. to the apparatus. The reaction was carried out at 300° C., a pressure of 245 atmospheres and gas circulation of 385 pressure liters per hour. The recovered cycling gas contained 9.5% by volume of ammonia and 1.1 liters of reaction product were removed per hour. The crude product, decanted from water and freed from low boiling components, had an amine number of 211 and contained 93% of distillable product having an amine number of 206. The gas chromatographic examination of the distillate showed 70% of octadecylamine and 29% of N-methyl octadecylamine. No trace of ester, amide or nitrile was found.

EXAMPLE V

Using the method of Example I, 1 liter of the dimethyl ester of sebacic acid and 1000 gm. of commercial methylamine, preheated together to 310° C., were introduced into the apparatus. The reaction was effected at 310° C. and a pressure of 245 atmospheres and with a gas circulation of 385 pressure hours. 1.5 liters of reaction product were removed per hour. The product was decanted from water and freed from low boiling components and had the amine number 520. Distillation gave 76% of distillable product with an amine number of 555. NMR-spectrographic examination of the distillate showed a content of 8% of primary decamethylenediamine, 84% of N-methyl decamethylenediamine and 8% of dimethyl decamethylenediamine. IR spectrographic examination showed 0.2% of nitrile in the distillate but no trace of ester or amide.

EXAMPLE VI 12 liters of the zinc oxide-aluminum oxide catalyst of preparation A were placed in a known hydrogenation apparatus consisting of a heated 14 liter pressure oven, a gas circulating system, a condenser and a pressure separator for separating hydrogen and for depressurizing the reaction product. After heating the oven to 310° C., 1 liter of methyl stearate and 400 g. of commercial methylamine, preheated together to 310° C., were introduced therein per hour. The reaction was carried out at 310° C., a pressure of 245 atmospheres and a gas circulation of 385 pressure liters per hour and 1.2 liters of the reaction product were removed per hour. The crude product, decanted from water and freed from low boiling components, had an amine number of 193 and contained 94% of distillable substance having an amine number of 197. The NMR spectrographic examination of the distillate showed 75% of N-methyl octadecylamine and 25% of N,N-dimethyl octadecylamine. IR-spectrographic examination showed 0.1% of stearyl nitrile and no trace of ester or amide.

EXAMPLE VII

Example VI was repeated except for the use of 400 g. of commercial dimethylamine in place of the methylamine and about 1.3 liters of reaction product were removed per hour. The crude product was worked up as in the previous example and 86% of the product was distillable and had an amine number of 184. The NMR spectrographic examination showed 3% of octadecylamine, 38% of N-methyl octadecylamine and 59% of N,N-dimethyl octadecylamine and IR spectrographic examination showed 0.2% of stearyl nitrile but no trace of ester or amides.

EXAMPLE VIII

Example VI was repeated except that the methyl stearate was replaced with an equal amount of methyl laurinate and 1.3 liters per hour of reaction product was taken off. The product, worked up as in Example VI, was 85% distillable which distillate had an amine number of 280. The NMR spectrographic examination showed 79% of N-methyl dodecylamine and 21% of N,N-dimethyl dodecylamine. The IR spectrographic examination showed 0.1% of laurinyl nitrile but no trace of ester or amide.

EXAMPLE IX

Example VI was repeated except the feed mixture was 1 liter of commercial butyl oleate (acid No. of 5.9; saponification No. of 170; iodine No. of 76; acid components by gas chromatography were 9.6% $C_{16}$, 12.8% $C_{16}$ 76.6% $C_{18}$ and 1.1% of $C_{20}$) and 500 gm. of ammonia, preheated together to 310° C., were fed into the apparatus. The reaction was effected at 310° C., a pressure of 250 atmospheres and a gas circulation of 385 pressure liters per hour and 1.0 liter of reaction product was recovered per hour. 74% of the product was distillable which distillate had an amine number of 210. The IR spectrum showed no trace of ester, amide or nitrile.

The particular advantage of the process of the invention resides in the one-step conversion of readily available starting materials into amines without the costly conversion into carboxylic acid amides or nitriles, in the fact that the preferred carboxylic acid esters are liquid at relatively low temperatures and therefore do not need special treatment such as heating or the addition of a solvent. Moreover, the said esters are non-corrosive.

The possibility of the production of amines given by the process according to the invention is all the more surprising as it could not be expected that the intermediate stages occurring during the formation of such compounds from carboxylic acids, namely formation of salts or amides, ester cleavage and possible nitrile formation, would be carried out with a speed sufficient for a continuous process. Through suitable variation of the reactants, i.e., alcohol moiety of the ester and alkyl radical of the amine, interesting preparations are possible. It is to be understood that variations of the process may be made without departing from the spirit or scope thereof.

We claim:

1. A process for the preparation of amines having the formula

wherein $R_1$ and $R_2$ are selected from the group consisting of hydrogen and alkyl of 1 to 4 carbon atoms and R is selected from the group consisting of saturated and unsaturated, straight and branch aliphatic of 4 to 24 carbon atoms which may be substituted with one

which comprises reacting an ester of a carboxylic acid selected from the group consisting of aliphatic mono- and dicarboxylic acids of 4 to 24 carbon atoms and an alkanol with a nitrogen compound of the formula

wherein $R_1$ and $R_2$ have the above definitions at a temperature of 200 to 400° C. and in the presence of hydrogen which be diluted with a reaction-inert gas at a pressure of 50 to 400 atmospheres and in the presence of a metal oxide catalyst in lump form selected from the group consisting of zinc oxide-chromium oxide and zinc oxide-aluminum oxide catalysts.

2. The process of claim 1 wherein the alkanol has 1 to 4 carbon atoms.

3. The process of claim 1 wherein the reaction is effected in a 50 to 500 mole excess of hydrogen.

4. The process of claim 1 when the catalyst is a zinc oxide-chromium oxide catalyst.

5. The process of claim 1 wherein the catalyst is a zinc oxide-aluminum oxide catalyst.

6. The process of claim 1 wherein the weight ratio of ester to nitrogen compound is 10:0.1X to 1:10X where X is the number of ester groups in the starting ester.

7. The process of claim 6 wherein the said weight ratio is 1:0.3X to 1:2.0X.

8. The process of claim 1 wherein the reactants are preheated to 50 to 350° C.

9. The process of claim 1 or 4 wherein the reaction is effected at a pressure of 100 to 300 atmospheres.

References Cited

UNITED STATES PATENTS

| | | | |
|---|---|---|---|
| 2,166,971 | 7/1939 | Schmidt et al. | 260—583(L) |
| 2,187,745 | 1/1940 | Lazier | 260—583(L)X |

CHARLES B. PARKER, Primary Examiner

R. L. RAYMOND, Assistant Examiner

U.S. Cl. X.R.

260—563, 570, 570.8, 570.9, 584, 585

UNITED STATES PATENT OFFICE
CERTIFICATE OF CORRECTION

Patent No. 3,579,584　　　　　　　　　　Dated May 18, 1971

Inventor(s)　　Horst Rutzen et al.

It is certified that error appears in the above-identified patent and that said Letters Patent are hereby corrected as shown below:

Column 2, line 32, "hydrgen" should read -- hydrogen --.
Column 8, line 2, "10:0.1X" should read -- 1:0.1X --.

Signed and sealed this 21st day of December 1971.

(SEAL)
Attest:

EDWARD M. FLETCHER, JR.　　　　ROBERT GOTTSCHALK
Attesting Officer　　　　　　　Acting Commissioner of Patents